United States Patent [19]

Sorensen et al.

[11] Patent Number: 5,746,965

[45] Date of Patent: May 5, 1998

[54] REMOVAL OF INJECTION-MOLDED TIE FROM MOLD BY RETRACTING CORE FROM BETWEEN PAWL AND ABUTMENT SURFACE OF TIE

[75] Inventors: Soren Christian Sorensen; Jens Ole Sorensen, both of Cayman Kai, Cayman Islands

[73] Assignee: GB Electrical, Inc., Milwaukee, Wis.

[21] Appl. No.: 584,685

[22] Filed: Jan. 8, 1996

[51] Int. Cl.$^6$ .......................... B65D 63/00; B29C 45/44
[52] U.S. Cl. .......................... 264/318; 24/17 AP; 249/63; 264/334; 425/556; 425/438; 425/DIG. 58
[58] Field of Search .......................... 24/16 PB, 17 AP, 24/30.5 P; 249/63, 64, 98, 101; 425/556, 577, 438, DIG. 58; 264/318, 328.1, 334, 336

[56] References Cited

U.S. PATENT DOCUMENTS

| | | | |
|---|---|---|---|
| 3,660,869 | 5/1972 | Caveney et al. | 24/16 PB |
| 3,924,299 | 12/1975 | McCormick | 24/16 PB |
| 4,383,670 | 5/1983 | Olschewski et al. | 264/334 |
| 4,473,524 | 9/1984 | Paradis | 264/291 |
| 4,476,913 | 10/1984 | Leuner et al. | 249/60 |
| 4,880,047 | 11/1989 | VanRens | 425/DIG. 58 |
| 4,986,942 | 1/1991 | Irgens et al. | 264/334 |
| 5,146,654 | 9/1992 | Caveney et al. | 24/16 PB |
| 5,389,330 | 2/1995 | Sorensen et al. | 264/328.1 |

*Primary Examiner*—Jill L. Heitbrink
*Attorney, Agent, or Firm*—Edward W. Callan

[57] ABSTRACT

In a method of injection molding a tie that includes an abutment wall surface having at least one tooth inside a locking head facing a pawl, a retractable core that defines at least a portion of the abutment surface that includes the at least one abutment surface tooth is retracted so that the tie can be removed from the mold without significantly damaging the at least one abutment surface tooth. The core is disposed for retraction in a direction inclined toward the pawl at an acute angle away from the direction of insertion of the tongue of the tie into the locking head.

14 Claims, 1 Drawing Sheet

FIG.3

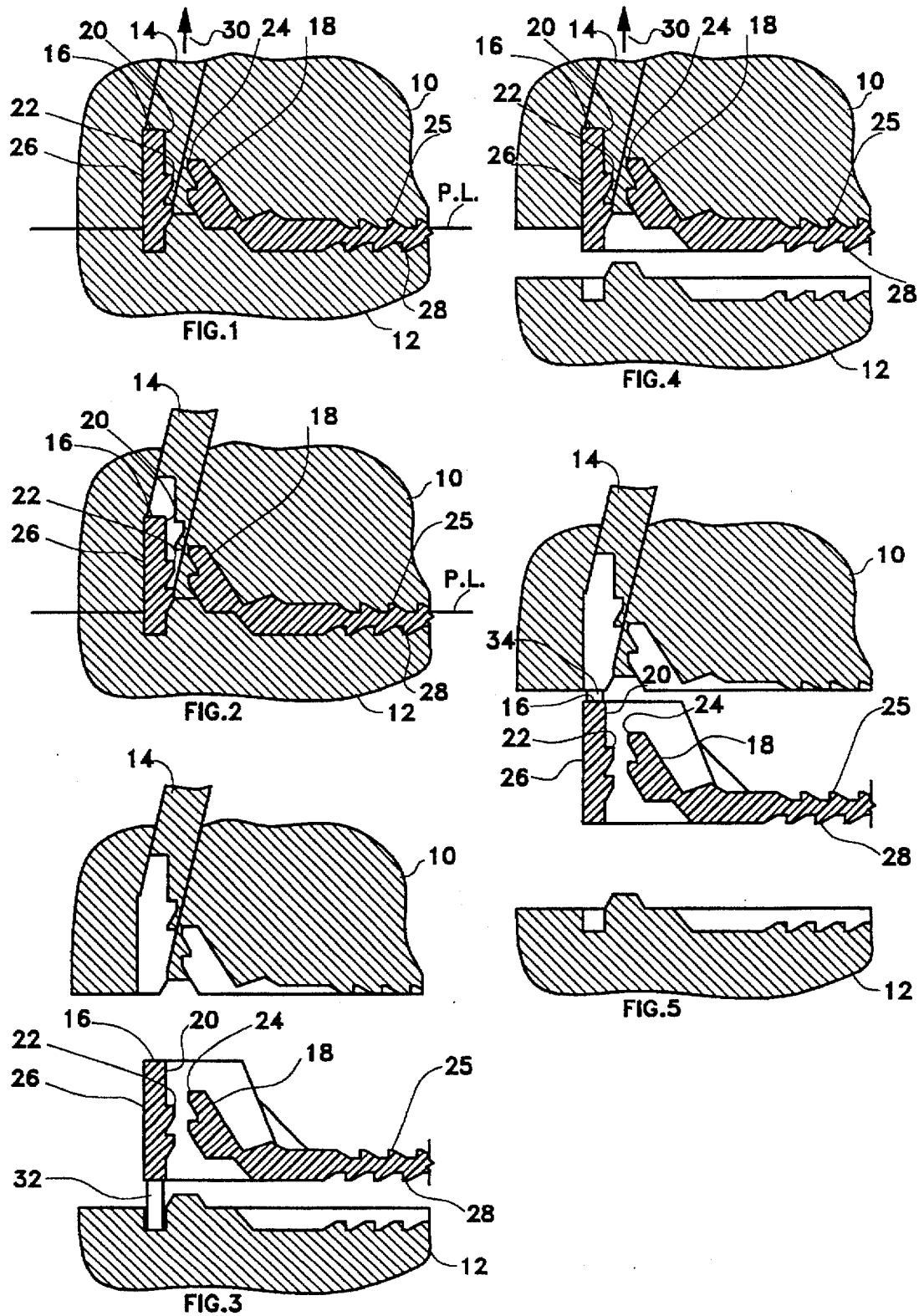

REMOVAL OF INJECTION-MOLDED TIE FROM MOLD BY RETRACTING CORE FROM BETWEEN PAWL AND ABUTMENT SURFACE OF TIE

BACKGROUND OF THE INVENTION

The present invention generally pertains to injection molding of a tie that is useful for forming a loop for retaining a bundle of elongated articles, such as cables. Such a tie is commonly known as a cable tie. The present invention is particularly directed to removal from the mold of a tie having at least one tooth on an abutment surface in the locking head of the tie.

One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

A prior art method of injection molding such a tie includes the steps of:

(a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold.

When such a tie is formed by injection molding, it is difficult to remove the tie from the mold without significantly damaging the at least one tooth on the abutment surface unless the apex of the tooth is defined at a parting line between mold parts because the portion of the mold part that defines the abutment surface has a lateral dimension that is broader than the space between such tooth and the pawl, whereby withdrawal of such mold part from a parting line between mold parts compresses and thereby distorts such tooth.

SUMMARY OF THE INVENTION

The present invention provides a method of injection molding a tie, wherein the tie is removed from the mold without significantly damaging the at least one tooth on the abutment surface.

The present invention provides a method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes first and second mold parts and a core that is retractable within the first mold part for defining a cavity between the mold parts in the general shape of the tie when the core is not retracted;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said retractable core that defines at least the portion of the abutment surface that includes the at least one abutment surface tooth, wherein the entire core is disposed for unitary retraction in a direction inclined toward the pawl at an acute angle away from the direction of insertion; and wherein step (d) comprises the step of (f) retracting the entire core unitarily from said portion of the abutment surface in said inclined direction so that the tie can be ejected from the mold pursuant to step (e) without significantly damaging the at least one abutment surface tooth.

Additional features of the present invention are described with reference to the detailed description of the preferred embodiments.

BRIEF DESCRIPTION OF THE DRAWING

FIG. 1 is a sectional view illustrating formation of the abutment surface portion of a tie in a mold utilized in preferred embodiments of the injection molding method of the present invention.

FIG. 2 is a sectional view illustrating movement of the core of the mold shown in FIG. 1 in accordance with one preferred embodiment of the injection molding method of the present invention.

FIG. 3 is a sectional view illustrating ejection of the tie from one mold part of the mold shown in FIG. 1 in accordance with one variation of the preferred embodiment of the injection molding method of the present invention shown in FIG. 2.

FIG. 4 is a sectional view illustrating movement of the core of the mold shown in FIG. 1 in accordance with another preferred embodiment of the injection molding method of the present invention.

FIG. 5 is a sectional view illustrating ejection of the tie from another mold part of the mold shown in FIG. 1 in accordance with another variation of the preferred embodiment of the injection molding method of the present invention shown in FIG. 2 and in accordance with the preferred embodiment of the injection molding method of the present invention shown in FIG. 4.

DETAILED DESCRIPTION

Referring to FIG. 1, in preferred embodiments of the method of the present invention, a tie of the type described above is injection molded in a mold including a first mold part 10, a second mold part 12 and a retractable core mold part 14. When the mold is closed, as shown in FIG. 1, the first mold part 10, the second mold part 12 and the core mold part 14 define a cavity therebetween in the general shape of the tie, which includes an abutment wall 16 and a pawl 18. An abutment surface 20 of the abutment wall 16 includes at least one tooth 22 facing the pawl 18; and the pawl 18 includes at least one tooth 24 facing the abutment wall 16. The first mold part 10 defines the pawl 18, the second set of ratchet teeth 25 and at least a portion of an outside surface 26 of the abutment wall 16 that is on the opposite side of the abutment wall 16 from the portion of the abutment surface 20 that includes the at least one abutment surface tooth 22. The second mold part 12 defines the first set of ratchet teeth 28. When the mold is closed, the first mold part 10 joins the second mold part 12 at a parting line P.L.

The retractable core mold part 14 is disposed when the mold is closed for defining at least a portion of the abutment surface 20 that includes the at least one abutment surface tooth 22. Preferably, the core mold part 14 does not define any portion of the outside surface 26 of the abutment wall 16 that is on the opposite side of the abutment wall 16 from the portion of the abutment surface 20 that includes the at least one abutment surface tooth 22. The core mold part 14 is disposed for retraction in a direction inclined toward the pawl 18 at an acute angle away from the direction of insertion 30 of the tongue of tie into the opening of the locking head when the tongue is inserted with the first set of ratchet teeth 28 facing the pawl 18.

Molten plastic material is injected into the mold cavity and solidified therein to form the tie.

The core mold part 14 is retracted away from the portion of the abutment surface 20 that includes the at least one abutment surface tooth 22 so that the tie can be removed from the mold without significantly damaging the at least one abutment surface tooth 22. The tie is then removed from the mold.

In one preferred embodiment, as shown in FIG. 2, the core mold part 14 is retracted while the first mold part 10 remains in contact with the second mold part 12.

The first mold part 10 is then separated from the second mold part 12 in a direction normal to at least a portion of the parting line P.L. with the tie being retained in the first mold part 10 and/or the second mold part 12. When the tie is retained in the second mold part 12, as the first mold part 10 is being separated from the second mold part 12, the tie is removed from the mold without significantly damaging the at least one abutment surface tooth 22. Referring to FIG. 3, the tie is then ejected from the second mold part 12 by protraction of a pair of ejector pins 32. When the tie is retained in the first mold part 10, the tie is ejected from the first mold part 10, as shown in FIG. 5, by protraction of a pair of ejector pins 34 without significantly damaging the at least one abutment surface tooth 22.

In another preferred embodiment, as shown in FIG. 4, the core mold part 14 is retracted not sooner than when the first mold part 10 is separated from the second mold part 12. The first mold part 10 is separated from the second mold part 12 in a direction normal to at least a portion of the parting line P.L. with the tie being retained in the first mold part 10. The tie is then ejected from the first mold part 10, as shown in FIG. 5, by protraction of a pair of ejector pins 34 without significantly damaging the at least one abutment surface tooth 22.

In alternative preferred embodiments (not shown), a mold is provided in which the retractable core mold part further defines at least the portion of the pawl that includes the at least one pawl tooth.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl, the method comprising the steps of (a) providing a mold that includes first and second mold parts and a core that is retractable within the first mold part for defining a cavity between the mold parts in the general shape of the tie when the core is not retracted;

(b) injecting molten plastic material into the mold cavity;

(c) solidifying the plastic material in the mold cavity to form the tie;

(d) separating the mold parts to enable ejection of the tie from the mold; and (e) ejecting the tie from the mold;

wherein step (a) comprises providing a said retractable core that defines at least the portion of the abutment surface that includes the at least one abutment surface tooth, wherein the entire core is disposed for unitary retraction in a direction inclined toward the pawl at an acute angle away from the direction of insertion; and wherein step (d) comprises the step of (f) retracting the entire core unitarily from said portion of the abutment surface in said inclined direction so that the tie can be ejected from the mold pursuant to step (e) without significantly damaging the at least one abutment surface tooth.

2. A method according to claim 1, wherein step (f) comprises retracting the core within the first mold part while the first mold part remains in contact with the second mold part.

3. A method according to claim 2, wherein step (e) comprises ejecting the tie from the first mold part.

4. A method according to claim 2, wherein step (e) comprises ejecting the tie from the second mold part.

5. A method according to claim 2, wherein the first and second mold parts are joined at a parting line and step (d) comprises separating the first and second mold parts in a direction normal to at least a portion of the parting line.

6. A method according to claim 1, wherein step (f) comprises retracting the core within the first mold part that defines at least a portion of a surface of the abutment wall that is on the opposite side of the abutment wall from the portion of the abutment surface that includes the at least one abutment surface tooth.

7. A method according to claim 6, wherein step (e) comprises ejecting the tie from the first mold part.

8. A method according to claim 6, wherein step (e) comprises ejecting the tie from the second mold part.

9. A method according to claim 1, wherein step (f) comprises retracting the core within the first mold part not sooner than the first mold part is separated from the second mold part.

10. A method according to claim 9, wherein step (e) comprises ejecting the tie from the first mold part.

11. A method according to claim 9, wherein the first and second mold parts are joined at a parting line and step (d) comprises separating the first and second mold parts in a direction normal to at least a portion of the parting line.

12. A method according to claim 1, wherein step (f) comprises retracting the core within the first mold part that defines at least a portion of a surface of the abutment wall that is on the opposite side of the abutment wall from the portion of the abutment surface that includes the at least one abutment surface tooth not sooner than the first mold part is separated from the mold part.

13. A method according to claim 12, wherein step (e) comprises ejecting the tie from the first mold part.

14. A method according to claim 1, wherein the core does not define a surface of the abutment wall that is on the opposite side of the abutment wall from the portion of the abutment surface that includes the at least one abutment surface tooth.

* * * * *